F. SAGERMAN.
CLOAK AND ROBE LOCK.
APPLICATION FILED FEB. 19, 1920.
1,395,525.
Patented Nov. 1, 1921.
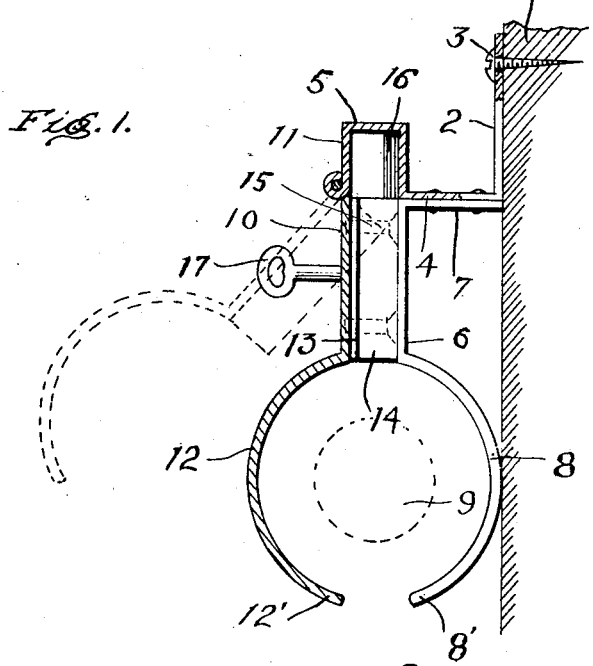
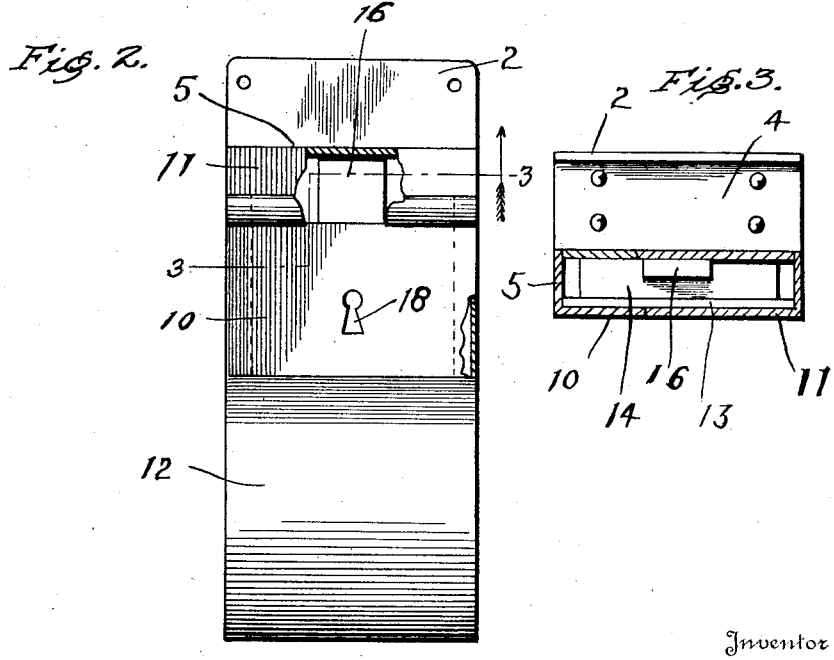
Witnesses
J. F. W. Cathran
Frank. D. O'Connell
Inventor
Frederick Sagerman
By Richard B. Owen
Attorney

UNITED STATES PATENT OFFICE.

FREDERICK SAGERMAN, OF CANTON, OHIO.

CLOAK AND ROBE LOCK.

1,395,525.  Specification of Letters Patent.  Patented Nov. 1, 1921.

Application filed February 19, 1920. Serial No. 359,974.

*To all whom it may concern:*

Be it known that I, FREDERICK SAGERMAN, a citizen of the United States, residing at Canton, in the county of Stark and State of Ohio, have invented certain new and useful Improvements in Cloak and Robe Locks, of which the following is a specification.

This invention relates to locking devices particularly adapted for use in connection with motor vehicles, especially pleasure cars and aims to provide means whereby robes, cloaks, and other apparel left in the car during the absence of the owner may be safe guarded against loss by theft or otherwise.

For the accomplishment of these purposes the invention contemplates the provision of clamping means, permanently associated with an appropriate portion of the car body and provided with movable jaws between which the robe or other apparel may be securely clamped and held against displacement therefrom by the subsequent locking of the jaws.

The further object of the invention is to provide improved locking means that may be associated with the ordinary robe rail provided on the back of a car seat and which may be immovably clamped in straddling position about the rail for preventing removal of articles hung on the rail and subsequently gripped by the straddling portions of the locking means.

With the above and other objects in view, which will appear as the clamping means is more particularly described, the invention resides in the combination and arrangement of parts and in the details of construction hereinafter referred to and pointed out in the drawings wherein Figure 1 is a side view of the lock as applied to the back of a car seat for association with the robe rail thereof.

Fig. 2 is a front elevation of a portion broken away to disclose the projected lock bolt and Fig. 3 is a transverse horizontal section taken on line 3—3 of Fig. 2.

In the drawing, the numeral 1 indicates an automobile seat as providing a support for the invention, although it is obvious and it is so to be understood that the invention can be applied to any other and appropriate support or may be attached to other parts of the automobile other than the seat because the invention is capable of being utilized with satisfactory results independent of any association with the robe rail.

For present purposes of illustration the invention is shown as attached to the back of a seat 1 and consists primarily of a supporting bracket having a back plate 2 suitably affixed to the seat by screws or other fastening elements 3 at an appreciable distance above the usual robe rail running transversely across the back of the seat and indicated in the circular dotted line structure of Fig. 1. The bracket plate 2 has a portion 4 extending outwardly therefrom and carrying at its outer end a housing 5 opening downwardly and with its top wall elevated above the plane of the portion 4 so that the housing forms a sort of abutment extending upwardly in spaced relation from the bracket plate 2, the purpose and object of which will be later explained. Suitably affixed to the bracket portion 4 by rivets or process of welding and thus being stationary therewith is a clamp member comprising a straight portion 6 having the angular extension 7 by means of which it is attached to the bracket and being further provided with an arcuate gripping finger 8 depending rearwardly below the straight portion so as to embrace the robe rail 9 on the side adjacent to the back of the seat. The finger 8, however, extends in spaced relation from the robe rail and is adapted to rest up against the seat in the manner illustrated.

A second clamping member 10 is hingedly connected to a front wall 11 of the housing 5 and depends in spaced relation to the clamping member 6. The clamp 10 is likewise provided with an arcuate finger 12 which embraces the robe rail on the side opposite to the finger 8, the terminal clamp ends 8' and 12', respectively being appreciably spaced for the purpose of permitting the robe or other apparel hung over the robe rail to be suspended from the rail between the clamping fingers. A lock base plate 13 is permanently affixed to the inner face of the outer clamp portion 10 and carries a lock casing 14 which is fastened to the base plate by means of bolts or other appropriate fastening elements 15. The lock casing occupies the space between the opposed clamp portions 6 and 10 respectively and is adapted by reason of its abutment against the clamp 6 to prevent further contraction of the fingers 8 and 12 respectively. The extent to which the terminals of the clamping fingers approach near to one another may be thus governed by the width of the particular lock employed, thus permitting the device to be adapted to certain requirements. The lock 14 is disposed with its operative end facing the housing 5, the latter being adapted to receive the lock bolt 16 when projected upwardly from the casing through the operation of the lock by means of a key 17 inserted through the key slot 18 formed in the clamp 10. The lock bolt, it is to be noted, when projected into the housing prevents the clamp 10 from being swung upwardly on its hinge and consequently any article hung on the robe rail and clamped by the fingers 8 and 10 cannot be moved from the rail until the unlocking of the device which will thus permit the outer clamps 10 to be swung free of the robe rail to the position indicated in dotted lines in Fig. 1.

In applying the invention for the purpose of preventing articles from being removed from the robe rail of a car the clamp is fixed to the back of the seat above the robe rail in the manner indicated with the lock bolt 16 withdrawn into the lock casing so as to permit the outer clamp arm 10 to swing freely, thus permitting any article to be readily hung over the rail and removed when desired without the necessity of unlocking the clamp. To securely clamp the article to the rail the outer arm 10 is then moved in toward the rail as far as possible so that the article will be clamped about the rail and between both fingers and will be immovably retained in such position by the subsequent operation of the lock. Only one having a proper key can operate the lock and thus remove the articles from the rail.

It is to be further related that the utility of the clamp does not depend upon its association with the robe rail but that it can be used with equally good results independent of any association with the rail as it is obvious that the clamp can be supported from any convenient place within the vehicle and may be used as a hanger for holding articles of various descriptions, it being merely necessary to insert the articles between the gripping fingers which, being both flexible may be bent toward each other to reduce the space therebetween and the locking of the clamp will enable the fingers to grip and securely retain articles encircled therebetween. In addition to this, the housing provides a supporting knob or hook member from which the various articles may be loosely hung and the space between the housing and the plate 2 may also be utilized as a temporary supporting shelf upon which various articles, such as gloves or the like may be deposited. The safe guarding of articles engaged by the clamps applies however to such articles only as are clamped between the gripping fingers and not to articles supported by the device externally of the clamping fingers as is obviously apparent.

Although the above contemplates the preferred embodiment of the invention it is to be understood that various changes in the style, arrangement and proportion of parts may be resorted to as fall within the scope of the invention as claimed.

Having thus described my invention what I claim as new and desire to secure by Letters Patent is:—

A device of the character described including a supporting bracket having a lock housing, clamp-members respectively connected to said bracket on opposite sides of the housing, one of said members being stationary with respect to the bracket, and the other member being pivotally connected thereto for swinging adjustment toward and away from the stationary member, and a locking mechanism carried by said pivoted member for alinement with the lock housing of the bracket when the two clamp-members are in proximity to each other, whereby a portion of the lock may be projected into the said housing to hold the members in proximity.

In testimony whereof I affix my signature in presence of two witnesses.

FREDERICK SAGERMAN.

Witnesses:
 ELMER R. ELKIS,
 TED SLABAUGH.